United States Patent
Ptak et al.

(10) Patent No.: US 11,009,161 B2
(45) Date of Patent: May 18, 2021

(54) FLEXIBLE JOINT AND METHOD OF MANUFACTURING FLEXIBLE JOINT

(71) Applicant: LORD Corporation, Cary, NC (US)

(72) Inventors: Keith R. Ptak, Erie, PA (US); David C. Riggs, Coppell, TX (US)

(73) Assignee: LORD Corporation, Cary, NC (US)

( * ) Notice: Subject to any disclaimer, the term of this patent is extended or adjusted under 35 U.S.C. 154(b) by 583 days.

(21) Appl. No.: 15/505,122

(22) PCT Filed: Aug. 18, 2015

(86) PCT No.: PCT/US2015/045709
§ 371 (c)(1),
(2) Date: Feb. 20, 2017

(87) PCT Pub. No.: WO2016/028792
PCT Pub. Date: Feb. 25, 2016

(65) Prior Publication Data
US 2017/0198845 A1    Jul. 13, 2017

Related U.S. Application Data

(60) Provisional application No. 62/039,644, filed on Aug. 20, 2014.

(51) Int. Cl.
*F16L 27/103*   (2006.01)
*E21B 33/038*   (2006.01)

(52) U.S. Cl.
CPC .......... *F16L 27/103* (2013.01); *E21B 33/038* (2013.01)

(58) Field of Classification Search
CPC ............................. F16L 27/103; E21B 17/085
(Continued)

(56) References Cited

U.S. PATENT DOCUMENTS

| 4,068,868 A | * | 1/1978 | Ohrt | E21B 17/085 |
| | | | | 285/223 |
| 4,491,348 A | * | 1/1985 | Thelen | F16L 27/103 |
| | | | | 285/263 X |

(Continued)

FOREIGN PATENT DOCUMENTS

| EP | 1559941 A1 | 8/2005 |
| EP | 3183414 B1 | 3/2019 |
| FR | 3011903 A1 * | 4/2015 ............ F16L 27/103 |

OTHER PUBLICATIONS

International Search Report and Written Opinion for Application No. PCT/US2015/045709 dated Nov. 23, 2015.

(Continued)

*Primary Examiner* — Zachary T Dragicevich
(74) *Attorney, Agent, or Firm* — Jenkins, Wilson, Taylor & Hunt, P.A.

(57) ABSTRACT

A flexible joint is provided. The flexible joint is for use in a steel catenary riser that includes a compression bearing (106) having a transition shim (120) and a plurality of alternating flexible elements (116) and shims (118) collectively stacked and bonded to a lower portion of the transition shim (120). The flexible joint also includes an inner bonding material (126) having a profile that is complementary to a profile of an extension tube (104), the inner bonding material (126) being disposed between the extension tube (104) and compression bearing (106) and configured to serve as a bonding mechanism between extension tube and compression bearing.

20 Claims, 7 Drawing Sheets

(58) Field of Classification Search
USPC .................................................. 285/223, 263
See application file for complete search history.

(56) References Cited

U.S. PATENT DOCUMENTS

| | | | | |
|---|---|---|---|---|
| 4,593,941 | A * | 6/1986 | Whightsil, Sr. | E21B 17/017 285/145.5 |
| 4,784,410 | A * | 11/1988 | Peppel | F16L 27/103 285/223 |
| 6,000,436 | A * | 12/1999 | Auvil | |
| 7,341,283 | B2 * | 3/2008 | Moses | E21B 17/085 285/223 |
| 2003/0019625 | A1 * | 1/2003 | Moog | F16L 27/103 |
| 2008/0139322 | A1 | 6/2008 | Forges et al. | |
| 2011/0266792 | A1 * | 11/2011 | Janon | F16L 27/103 |

OTHER PUBLICATIONS

European Office Action for Application No. 15756759.5 dated Mar. 29, 2018.

* cited by examiner

FLEXIBLE JOINT AND METHOD OF MANUFACTURING FLEXIBLE JOINT

CROSS-REFERENCE TO RELATED APPLICATIONS

The instant application is the National Stage of International Application No. PCT/US2015/045709 filed Aug. 18, 2015, which claims the benefit of U.S. Provisional Patent Application Ser. No. 62/039,644, filed Aug. 20, 2014, the disclosure of which is incorporated herein by reference in its entirety.

FIELD OF THE INVENTION

The subject matter disclosed herein relates to systems comprising elastomeric bearings such as flexible joints for steel catenary risers.

BACKGROUND

In some cases, flexible joints such as riser bearings for steel catenary risers comprise elastomeric components that degrade in response to exposure to fluids passing through a central fluid passage of the flexible joints. Some flexible joints comprise long components that do not fit well within standard rubber presses. Some flexible joints comprise large diameter housings that require specially sized transfer molding equipment that is expensive and not typical. Some flexible joint construction methods may require sprues required for a transfer molding process that are undesirably longer and more circuitous than desired, resulting in a significant pressure drop which leads to less than ideal molding parameters. Also, some methods of constructing flexible joints require specially designed and/or expensive presses for accomplishing the molding due to the excessive weight of the total assembly being molded in a single molding/bonding process.

SUMMARY

In some embodiments of the disclosure, a flexible joint is disclosed as comprising a housing; an extension tube comprising a substantially frustoconical upper profile; a compression bearing comprising a transition shim and at least one flexible element bonded to the transition shim; and an inner bonding material comprising a substantially frustoconical profile that is complementary to the substantially frustoconical upper profile of the extension tube, wherein the inner bonding material is bonded to each of the extension tube and the transition shim of the compression bearing.

In other embodiments of the disclosure, a method of constructing a flexible joint is disclosed as comprising: molding a compression bearing comprising a transition shim and a stack of alternating elastomeric elements and shims; capturing the compression bearing between a housing and an extension tube; disposing an inner bonding material between the transition shim and the extension tube; and placing the compression bearing in a state of compression.

DETAILED DESCRIPTION

This application discloses flexible joints configured to protect some elastomeric elements of the flexible joints from fluids passing through central fluid flowpaths of the flexible joints. The application also discloses methods of constructing the above-described flexible joints utilizing relatively less expensive and/or equipment of smaller physical size relative to the equipment conventionally utilized to construct conventional flexible joints. Accordingly, this disclosure provides (1) flexible joints capable of providing a long service life in spite of fluids passing through the central fluid flowpaths of the flexible joints and (2) methods of constructing the flexible joints in a cost-effective manner without the need for utilization of unnecessarily expensive and very large manufacturing equipment.

Figure 1:
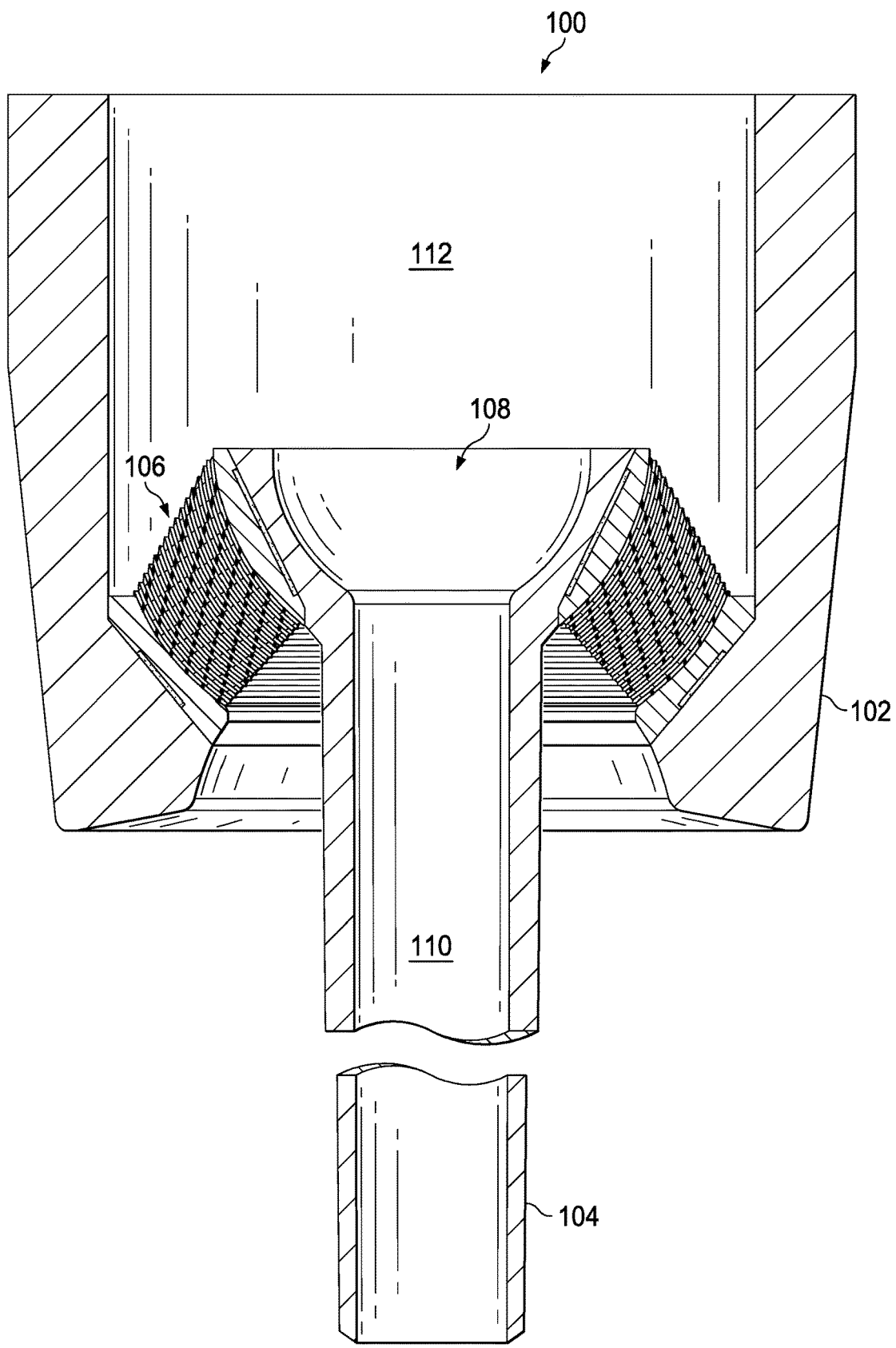
FIG. 1 is an orthogonal cutaway side view of a flexible joint according to an embodiment of the disclosure.

Referring to FIG. 1, a flexible joint 100 is shown. Flexible joint 100 comprises housing 102, extension tube 104, and bearing 106 disposed between housing 102 and extension tube 104. Bearing 106 is captured between housing 102 and extension tube 104 so that when housing 102 and extension tube 104 are loaded with forces attempting to move housing 102 and extension tube 104 away from each other, bearing 106 is captured and compressed between housing 102 and extension tube 104. In this embodiment, bearing 106 generally provides for cocking motions of up to about +/−20 degrees even when the above-described tension loading is applied. Flexible joint 100 generally comprises a central fluid flowpath 108 through which production fluids may pass through the flexible joint 100. Central fluid flowpath 108 generally comprises a central bore 110 of extension tube 104 and an interior 112 of housing 102. Central fluid flowpath 108 also includes a central passage of bearing 106.

Figure 2:
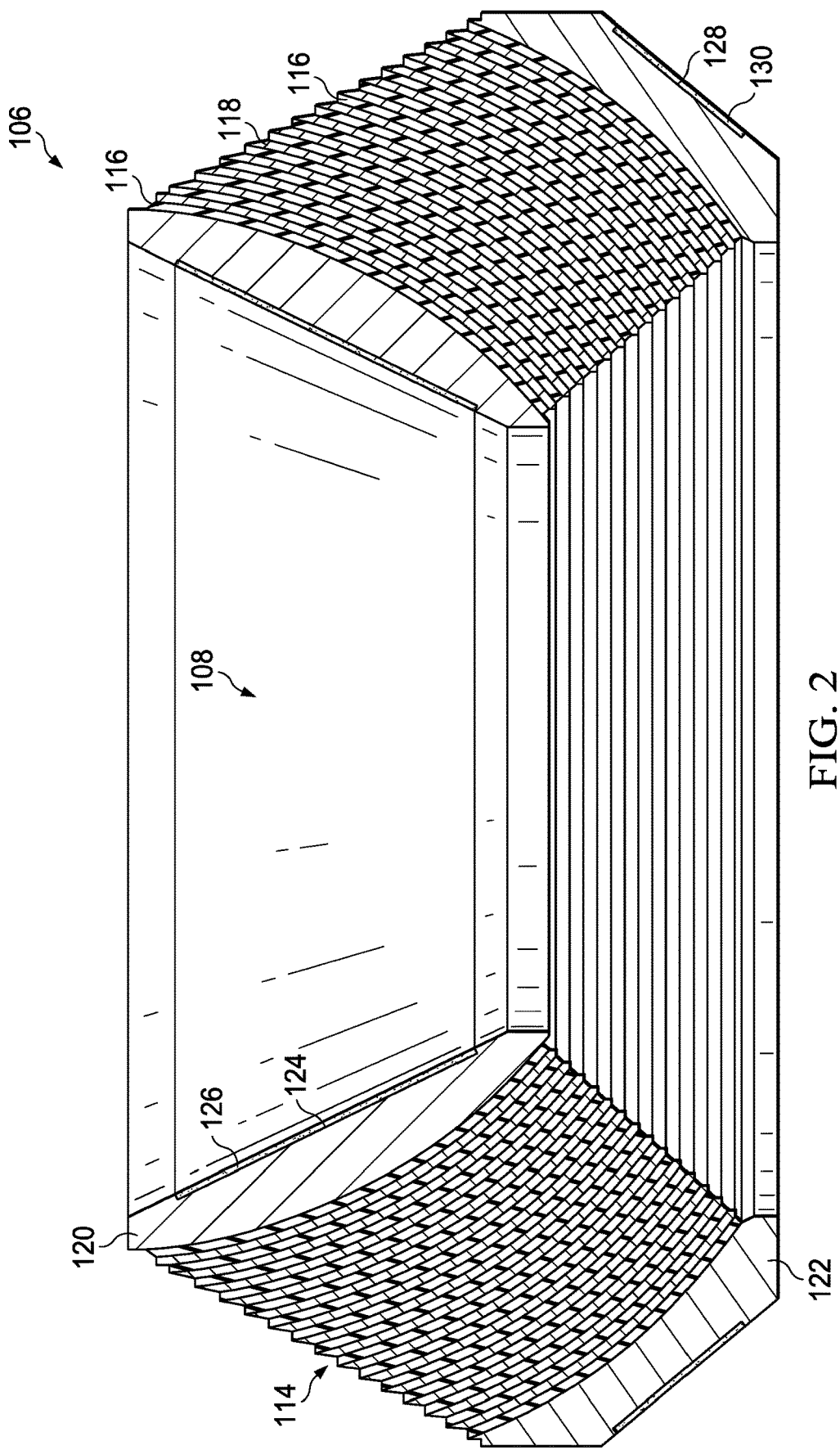
FIG. 2 is an orthogonal cross-sectional side view of a molded flexible joint bearing of the flexible joint of FIG. 1.

Referring now to FIG. 2, bearing 106 is shown in isolation. Bearing 106 generally comprises a stack 114 of flexible elastomeric elements 116 and metal shims 118. Bearing 106 further comprises an inner member 120 configured to interface with extension tube 104 and an outer member 122 configured to interface with housing 102. In this embodiment, inner member 120 comprises a recessed channel 124 configured to receive an inner bonding material 126, and outer member 122 comprises a recessed channel 128 configured to receive an outer bonding material 130.

Referring now to FIGS. 1 and 2, inner bonding material 126 and outer bonding material 130 are shown as extending over less than the entire interface between the respective members 120, 122 and extension tube 104 and housing 102, respectively. In this embodiment, inner bonding material 126 and outer bonding material 130 are loaded in compression to a much lower extent than members 120, 122 so that the primary function of inner bonding material 126 is providing a material for bonding, and the primary function of outer bonding material 130 is to provide a material for bonding rather than providing a force transfer path when flexible joint 100 is loaded in tension. However, in alternative embodiments, inner bonding material 126 and outer bonding material 130 may fully line the interfaces between members 120, 122 and extension tube 104 and housing 102, respectively, so that they are each in substantial compressive loading while providing a bond interface to members 120, 122. In still other embodiments, one or both of inner bonding material 126 and outer bonding material 130 may comprise an overhanging portion that is not compressed when the flexible joint is in tension.

Figure 3:
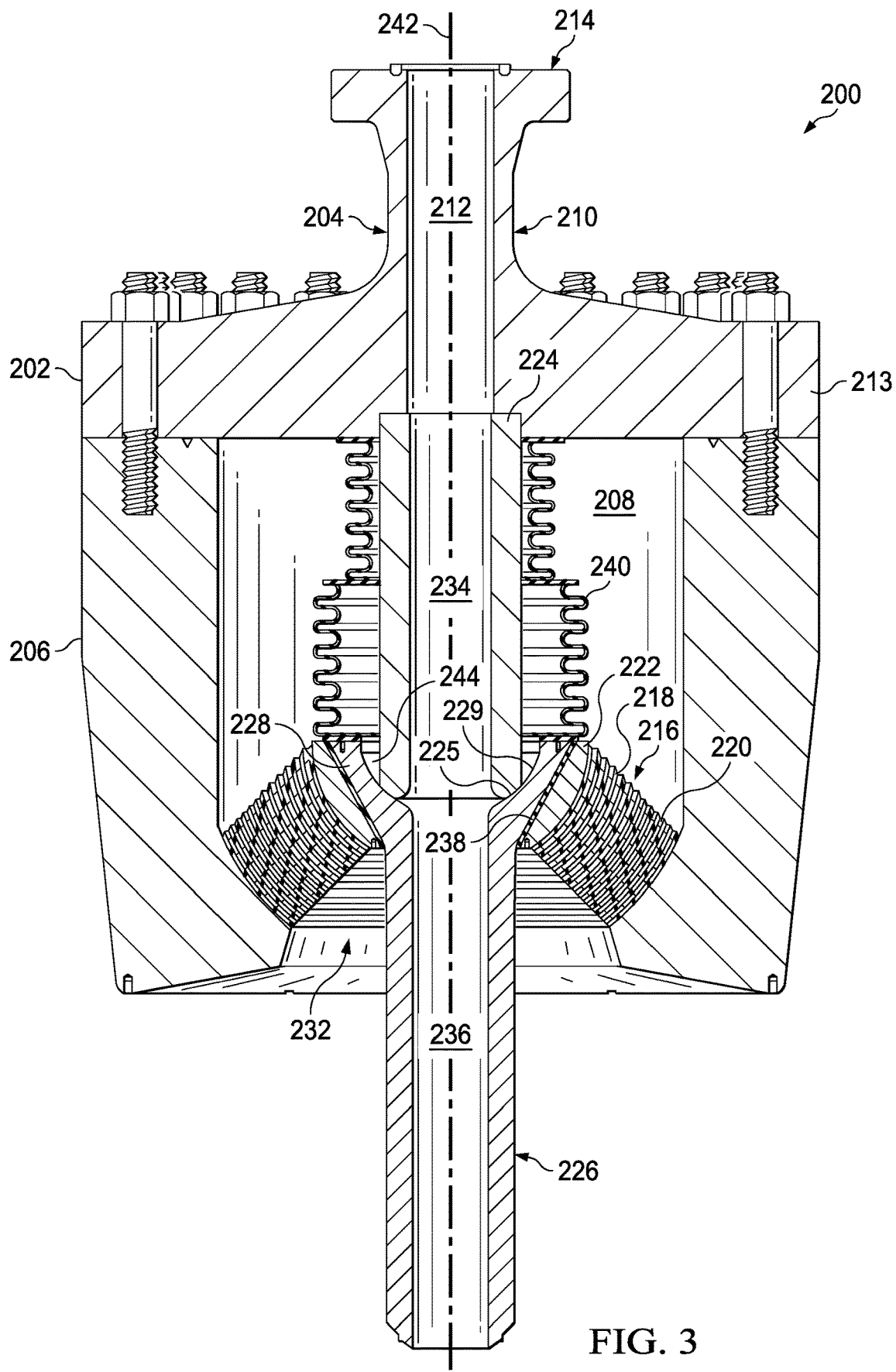
FIG. 3 is an orthogonal cutaway side view of a flexible joint according to another embodiment of the disclosure.

Referring now to FIG. 3, an orthogonal cutaway side view of a flexible joint 200 is shown according to another embodiment of the disclosure. Flexible joint 200 comprises a housing 202 having an upper portion 204 attached to a lower portion 206 that defines an interior space 208 of the flexible joint 200 when assembled. Upper portion 204 of housing 202 generally includes an elongated upper portion 210 extending vertically from a base 213 of the upper portion 204 of housing 202. Upper portion 210 includes a central bore 212 and connection end 214, such as a flange. Flexible joint 200 also comprises a compression bearing 216 that is a high capacity laminate (HCL) bearing comprising a plurality of alternating elastomeric elements 218 and shims 220 that are bonded to an upper transition shim 222. A section view of transition shim 222 provides for a substantially flat upper surface when compared to a radiused lower surface and transition shim 222 is configured to provide a curvature to the stack of alternating elastomeric elements 218 and shims 220 bonded to the transition shim 222. The upper surface of the transition shim 222 is substantially flat when compared to the radiused lower surface at any selected section of the transition shim, wherein the lower surface is correspondingly radiused at that same selected section. Referring to FIG. 2, in a three dimensional view (not shown), transition shim 222 flat upper surface is conical. In some embodiments, the compression bearing 216 is substantially similar to bearing 106 of FIGS. 1-2 but does not include outer member 122. Accordingly, a lower elastomeric element 218 or a lower shim 220 may be bonded to an inner surface of the lower portion 206 of housing 202.

Flexible pipe joint further comprises a central pipe 224 and an extension tube 226, sometimes referred to as a nipple. Extension tube 226 comprises an upper portion 228 captured between the compression bearing 216 and a lower end of the central pipe 224 and having generally frustoconical outer profile. Extension tube 226 also comprises a lower portion 230 having a substantially elongated tube that extends through an opening 232 in the lower portion 206 of housing 202. Upon assembly of flexible joint 200, central pipe 224 may be disposed in an upper cavity 244 of the upper portion 228 of extension tube 226. As will be discussed in greater detail herein, when assembled, central pipe 224 may exert a compressive force on extension tube 226 and consequently to the compression bearing 216. When system is pulled in tension, a gap is formed between end 225 of central pipe 224 and surface 229 of upper portion 228. Additionally, each of the central pipe 224 and the extension tube 226 also comprises a central bore 234, 236, respectively, for carrying production fluids through flexible joint 200.

When flexible joint 200 is assembled, a central fluid flow path may be formed through flexile joint 200. More specifically, central bore 212 of upper portion 204 of housing 202, central bore 234 of central pipe 224, and central bore 236 of extension tube 226 may collectively form a central fluid flow path through flexible joint 200. Flexible joint 200 may also comprise a bellows 240 attached to upper portion 204 of housing 202 and upper portion 228 of extension tube 226. Bellows 240 is generally configured to form an annular fluid seal to prevent production fluids in the central fluid flow path from reaching interior space 208 of flexible joint 200. Additionally, the geometric tolerances of upper portion 204 of housing 202, central pipe 224, and/or extension tube 226 may contribute to the exertion of a preloaded compressive force on the compression bearing 216. In an embodiment, when flexible joint 200 is in tension, a gap is formed between end 225 of central pipe 224 and surface 229 of upper portion 228 between central pipe. In this embodiment, compression bearing 216 generally provides for cocking motions of extension tube 226 up to about +/−20 degrees with respect to central axis 242. Flexible joint 200 further comprises an inner bonding material 238 disposed between extension tube 226 and compression bearing 216. In some embodiments, inner shield 238 is configured to provide the bonding mechanism between extension tube 226 and compression bearing 216. More specifically, inner bonding material 238 is bonded to an outer surface of the upper portion 228 of extension tube 226 and an upper surface of the transition shim 222 of compression bearing 216. Furthermore, in other embodiments, inner bonding material 238 is substantially similar to inner bonding material 126 of FIGS. 1-2 without outer member 122 and configured to perform in a substantially similar manner. However, inner bonding material 238 generally extends beyond transition shim 222 at least up to lower portion 230 of extension tube 226.

While only a cut-away view of the flexible joint 200 is shown, the components of the flexible joint 200 are generally annular in form so that they extend uninterrupted angularly around central axis 242 of flexible joint 200 in three-dimensional space. Upper portion 228 of extension tube 226 comprises a generally frustoconical outer profile. In addition, inner bonding material 238 also comprises a frustoconical profile that is complementary to the generally frustoconical profile of the upper portion 228 of extension tube 226. Also, in some embodiments, inner bonding material 238 comprises a slight outward curvature at the bottom of the inner bonding material 238, generally adjacent to a radiused-transition between upper portion 228 and lower portion 230 of extension tube 226. In operation, inner bonding material 238 is configured to provide an interface material for bonding compression bearing 216 and extension tube 226. The frustoconical profiles of both the upper portion 228 of extension tube 226 and inner bonding material 238 are configured to also impart structural strength to the bond between them. Further, inner bonding material 238 may comprise multiple layers of an elastomeric bonding material. The layers of inner bonding material 238 having a slight outward curvature are designed to take both shear and compression loading, whereas the frustoconical layers of inner bonding material 238 are designed to convert a cocking motion into a compression load.

Figure 4:
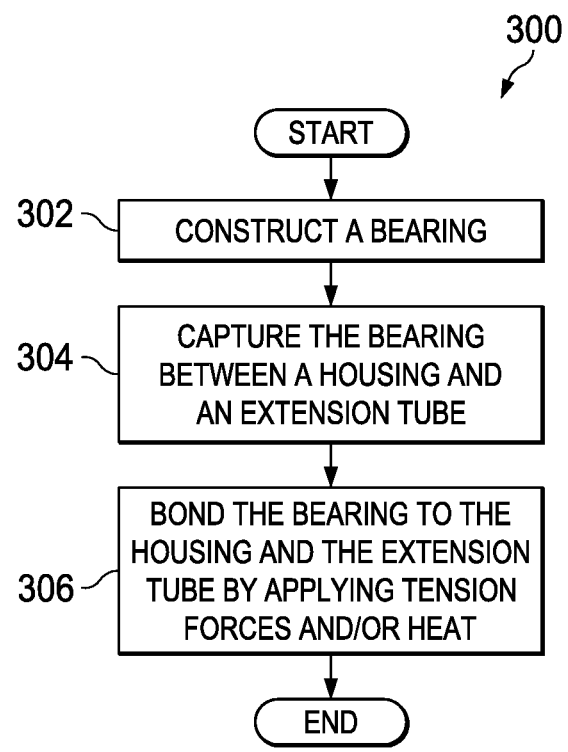
FIG. 4 is a flowchart of a method of constructing a flexible joint according to an embodiment of the disclosure.

Referring now to FIG. 4, a flowchart of a method 300 of constructing a flexible joint such as flexible joint 100 or flexible joint 200 is shown. The method 300 may begin at block 302 by first molding a bearing comprising an inner member, an outer member, and a stack of elastomeric elements and shims. In some embodiments, however, the bearing may be compression bearing 216 and is molded without an outer member (i.e. outer member 122 of FIGS. 1-2). In some embodiments, the bearing is molded using in a transfer molding process using a mold that is small and relatively typical for a transfer molding process. The method 300 may continue at block 304 by assembling a flexible joint by capturing the molded bearing between a housing and an extension tube. In some embodiments, an inner bonding material may be disposed between the molded bearing and the extension tube. Further, in some embodiments, the inner bonding material provides an interface material for bonding the molded bearing and the extension tube. The method 300 may continue at block 306 by loading the assembly in tension, in some cases by generally pulling the housing away from the extension tube which puts the flexible joint 100 or 200 in a local state of compression, and bonding the bearing to the housing and to the extension tube. In some cases, this may be achieved using simple fixtures, an oven, induction heating, and/or any other suitable system for providing heat to the assembly.

The process of block 306 may be accomplished in at least the following three ways. First, an inner bonding material and outer bonding material may be bonded to the innermost surfaces of the inner member and outermost surfaces of the outer member, respectively, during the process of block 302 and the inner bonding material and/or outer bonding material (in some embodiments comprising elastomer pads) may be post-vulcanization bonded to the housing and extension tube during the process of block 306.

Second the inner bonding material and outer bonding material may not be included in the process of block 302, but rather, during the process of block 306, uncured elastomer for forming the inner bonding material and/or the outer bonding material may be placed on the inside surfaces of the inner member and/or outside surfaces of the outer member, respectively, and vulcanized to hot bond the bearing, the housing, and the extension tube together.

Third, an epoxy or other adhesive may be used to bond the smaller bearing to the housing and extension tube.

In some embodiments, the bearing may be molded directly to the housing but not the extension tube, or vice-versa, in the process of block 302 since this still allows for a simplified multi-step bonding/molding process wherein the remaining extension tube or housing is bonded in the process of block 306.

Regardless of the particular multi-step bonding process utilized, the method 300 multi-step bonding process reduces the size of the molds, reduces the size of the required presses, enables the relatively more robust transfer molding process instead of forcing the use of the less robust compression molding process or more risky transfer molding process with the larger components, reduces the complexity of the transfer molding process for the components, reduces the cost of the mold and bonding process even though a second step of block 306 and additional components are added.

In some embodiments, the inner bonding material may be encapsulated within the metal components which are utilized to help transfer load. Because of this, the inner bonding material may not be loaded as severely as the elastomer layers in the bearing, and the main functions of the inner bonding material may be to bond the components together and to resist pressure loads from the fluid passing through the central fluid flowpath.

Figure 5:
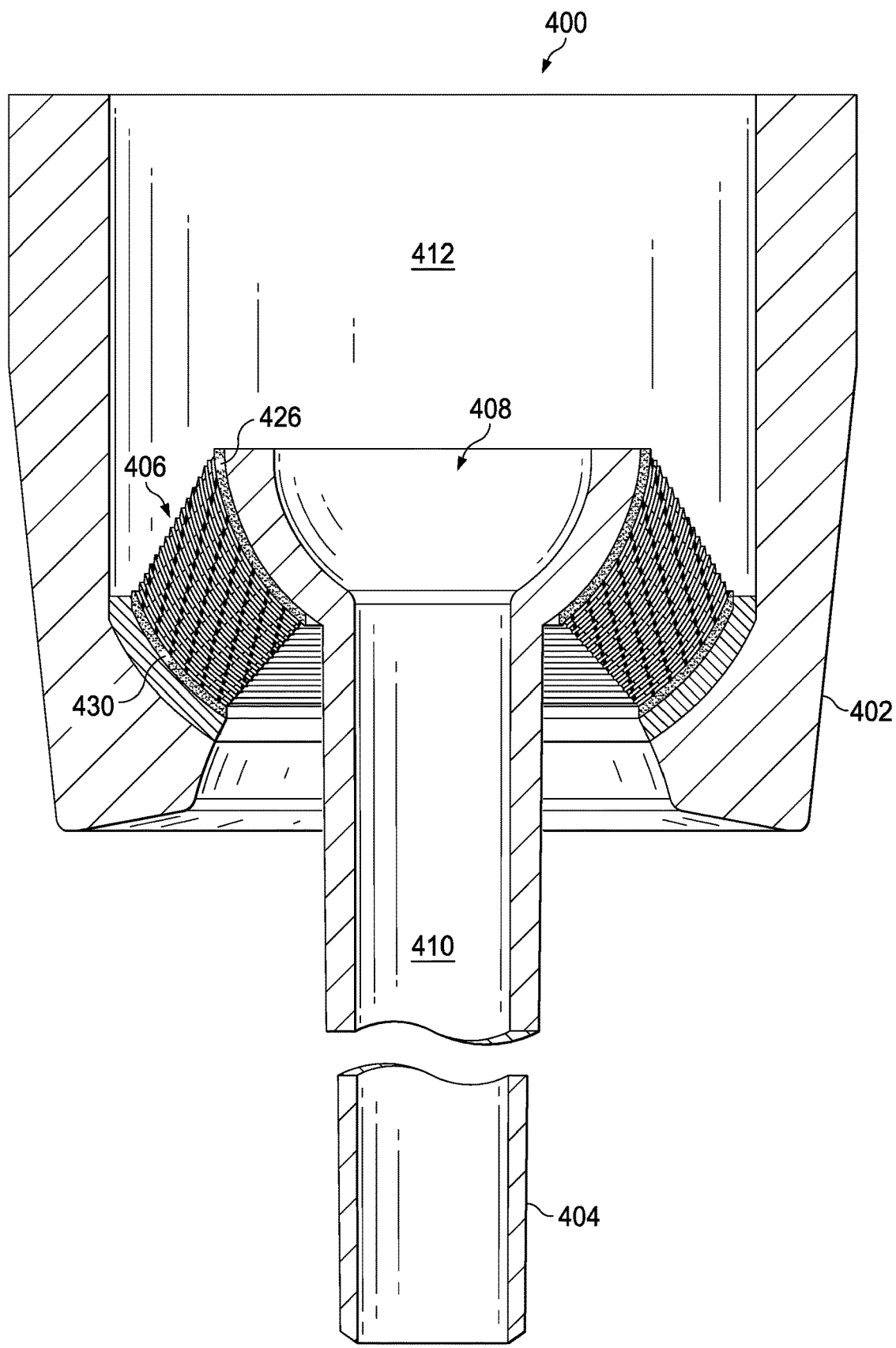
FIG. 5 is an orthogonal cutaway side view of a flexible joint according to another embodiment of the disclosure.

Referring now to FIG. 5, a flexible joint 400 is shown. Flexible joint 400 comprises a housing 402, an extension tube 404, and a bearing 406 disposed between housing 402 and extension tube 404. Bearing 406 is captured between housing 402 and extension tube 404 so that when housing 402 and extension tube 404 are loaded with forces that attempt to move housing 402 and extension tube 404 away from each other, bearing 406 is captured and compressed between housing 402 and extension tube 404. In this embodiment, bearing 406 generally provides for cocking motions of up to about +/−20 degrees even when the above-described tension loading is applied. Flexible joint 400 generally comprises a central fluid flowpath 408 through which production fluids may pass through the flexible joint 400. Central fluid flowpath 408 generally comprises a central bore 410 of extension tube 404 and an interior 412 of housing 402. Central fluid flowpath 408 also includes a central passage of bearing 406.

Figure 6:
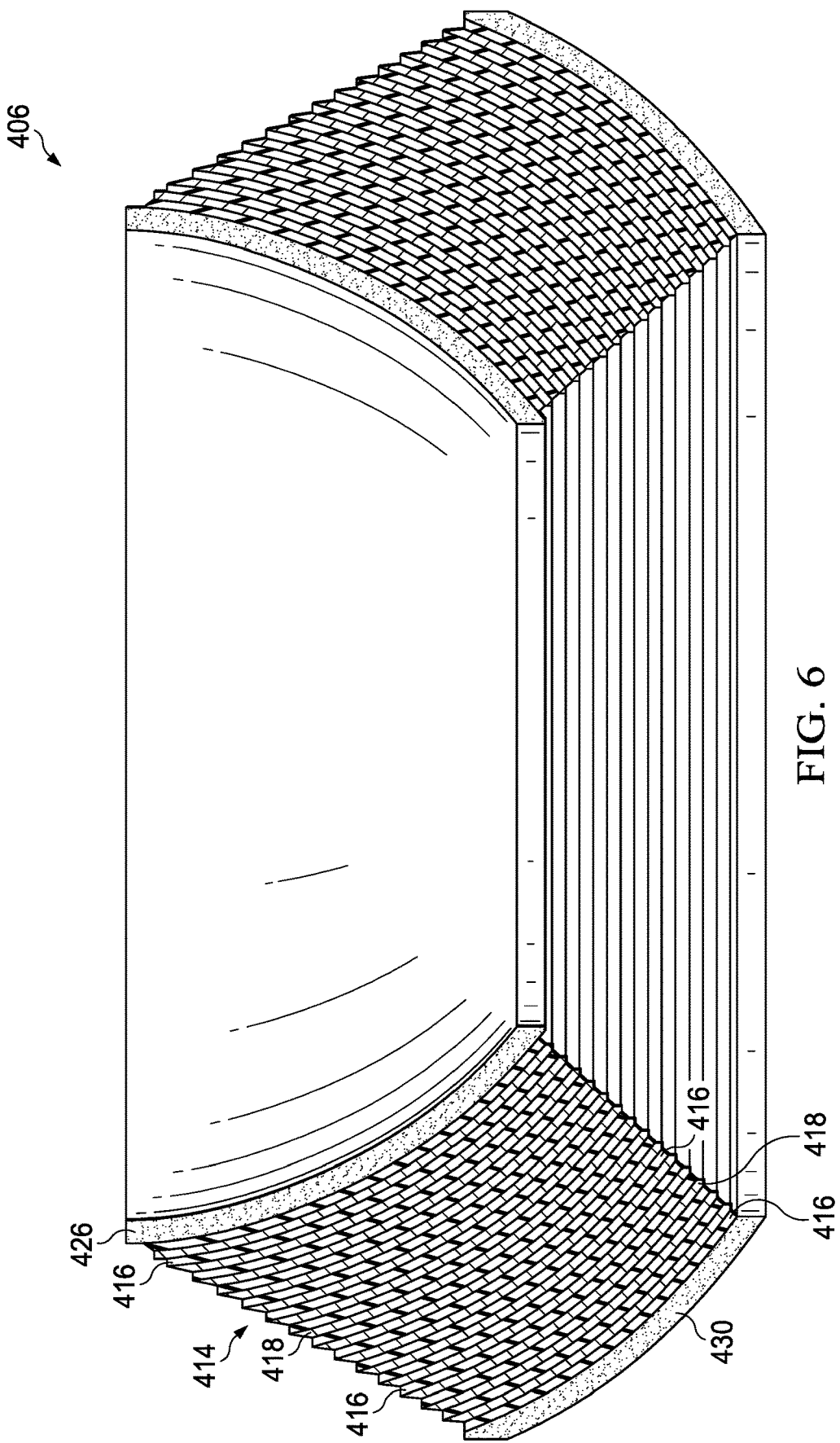
FIG. 6 is an orthogonal cross-sectional side view of a molded flexible joint bearing of the flexible joint of FIG. 5.

Referring now to FIG. 6, the bearing 406 is shown in isolation. Bearing 406 generally comprises a stack 414 of flexible elastomeric elements 416 and metal shims 418. Bearing 406 further comprises an inner bonding material 426 and an outer bonding material 430.

Referring now to FIGS. 5 and 6, the inner bonding material 426 and outer bonding material 430 extending over substantially the entire interface between bearing 406 and the extension tube 404 and housing 402, respectively. In this embodiment, the inner bonding material 426 and outer bonding material 430 provide a force transfer path when flexible joint 400 is loaded in tension. In this embodiment, each of inner bonding material 426 and outer bonding material 430 are shaped substantially similarly to innermost and outermost shims 118, respectively. Accordingly, inner bonding material 426 and outer bonding material 430 may comprise substantially the same thickness and center of rotation as the above-described respective shims 118. In particular, inner bonding material 426 is shaped substantially similar to innermost shim 418, and inner bonding material 426 may function similar to elastomeric elements 416. In other embodiments, inner bonding material 426 and/or the outer bonding material 430 may be shaped different from shims 418 and resultantly may provide a different center of rotation relative to the center of rotation of shims 418, thereby changing the shear strain of the innermost and/or outermost elastomeric elements 416, respectively, via compound type stiffness and without changing the shear area with respect to other components. In alternative embodiments, one or both of inner bonding material 426 and outer bonding material 430 may be bonded to a shim 418 rather than an elastomeric element 416.

Figure 7:
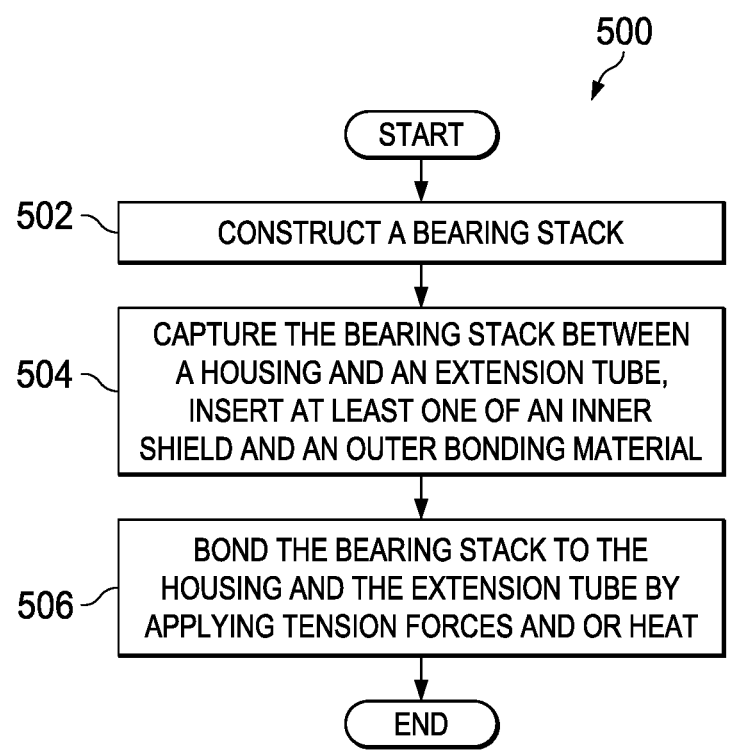
FIG. 7 is a flowchart of a method of constructing a flexible joint according to another embodiment of the disclosure.

Referring now to FIG. 7, a flowchart of a method 500 of constructing a flexible joint such as flexible joint 400. The method 500 may begin at block 502 by first molding a bearing comprising a stack of elastomeric elements and shims. In some embodiments, the bearing is molded using in a transfer molding process using a mold that is small and relatively typical for a transfer molding process. The method 500 may continue at block 504 by assembling a flexible joint by capturing the molded bearing between a housing and an extension tube and inserting at least one of an inner bonding material, such as inner bonding material 426 or inner bonding material 238, and an outer bonding material, such as outer bonding material 430, between the stack and the extension tube and housing, respectively. The method 500 may continue at block 506 by loading the assembly in tension, in some cases by generally pulling the housing away from the extension tube which puts the flexible joint 400 in a local state of compression, and bonding the bearing to the housing and to the extension tube. In some cases, this may be achieved using simple fixtures, an oven, induction heating, and/or any other suitable system for providing heat to the assembly.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A flexible joint comprising:
   a housing;
   an extension tube disposed at least partially within the housing, wherein the extension tube comprises a substantially frustoconical upper profile;
   a compression bearing comprising:
      a transition shim having an upper surface and a lower surface, wherein the upper surface of the transition shim is substantially flat when compared to the lower surface at any selected section of the transition shim, wherein the lower surface is correspondingly radiused at that same selected section; and
      at stack of a plurality of alternating elastomeric elements and shims, the stack being bonded to the lower surface of the transition shim;
   wherein each of the elastomeric elements is a discrete layer that is disconnected from others of the elastomeric elements; and
   an inner bonding material bonded to each of the extension tube and the upper surface of the transition shim of the compression bearing, wherein the upper surface of the transition shim is bonded to a surface of the frustoconical upper profile of the extension tube;
   wherein the compression bearing is bonded to an inner surface of the housing.

2. The flexible joint of claim 1, wherein the inner bonding material has a substantially frustoconical profile that is complementary to the substantially frustoconical upper profile of the extension tube.

3. The flexible joint of claim 2, wherein the inner bonding material extends inward beyond the transition shim.

4. The flexible joint of claim 3, wherein the inner bonding material comprises an elastomeric material.

5. The flexible joint of claim 4, wherein the inner bonding material comprises a plurality of layers of the elastomeric material.

6. The flexible joint of claim 1, comprising a central pipe disposed between a first end of the housing, which is opposite a second end of the housing through which a lower portion of the extension tube extends, and a cavity formed in an upper portion of the extension tube.

7. The flexible joint of claim 6, wherein the central pipe is substantially coaxial with the extension tube and inserted at least partially within the cavity formed in the upper portion of the extension tube, such that the central pipe is configured to exert, by the central pipe contacting the extension tube, a compression force on the compression bearing when the flexible joint is assembled.

8. The flexible joint of claim 7, wherein the compression bearing is configured to allow the extension pipe to traverse angularly up to about 20 degrees as measured from a central axis extending through the flexible joint.

9. A method of constructing a flexible joint, the method comprising:
   disposing an extension tube, which comprises at substantially frustoconical upper profile, at least partially within a housing;
   providing a transition shim having an upper surface and a lower surface, wherein the upper surface of the transition shim is substantially flat when compared to the lower surface at any selected section of the transition shim, wherein the lower surface is correspondingly radiused at that same selected section;
   molding a compression bearing comprising the transition shim and a stack of a plurality of alternating elastomeric elements and shims, the stack being bonded to the lower surface of the transition shim, wherein each of the elastomeric elements is a discrete layer that is disconnected from others of the elastomeric elements;
   bonding, using an inner bonding material, the upper surface of the transition shim to a surface of the frustoconical profile of the extension tube;
   capturing the compression bearing between the housing and the extension tube;
   bonding the compression bearing to the housing; and
   placing the compression bearing in a state of compression.

10. The method of claim 9, wherein the inner bonding material is an elastomeric material.

11. The method of claim 10, wherein the inner bonding material extends inward beyond the transition shim.

12. The method of claim 9, wherein placing the compression bearing in a state of compression is accomplished by pulling the housing away from the extension tube.

13. The method of claim 9, wherein placing the compression bearing in a state of compression is accomplished by disposing a central pipe between a first end of the housing, which is opposite a second end of the housing through which a lower portion of the extension tube extends, and a cavity formed in an upper portion of the extension tube.

14. The method of claim 13, comprising disposing the central pipe substantially coaxially with the extension tube and inserting the central pipe at least partially within the cavity formed in the upper portion of the extension tube to exert, by the central pipe contacting the extension tube, a compression force on the compression bearing when the flexible joint is assembled.

15. The method of claim 9, comprising:
   passing fluid through the flexible joint; and
   cocking the extension tube up to about 20 degrees, as measured from a central axis extending through the flexible joint.

16. A flexible joint comprising:
   a housing;
   an extension tube disposed at least partially within the housing, wherein the extension tube comprises a substantially frustoconical upper profile;
   a compression bearing comprising:
      a transition shim having an upper surface and a lower surface, wherein the upper surface of the transition shim is substantially flat when compared to the lower surface at any selected section of the transition shim, wherein the lower surface is correspondingly radiused at that same selected section; and
      at least one flexible element bonded to the lower surface of the transition shim;
   an inner bonding material bonded to each of the extension tube and the upper surface of the transition shim of the compression bearing, wherein the upper surface of the transition shim is bonded to a surface of the frustoconical upper profile of the extension tube; and
   a central pipe disposed between a first end of the housing, which is opposite a second end of the housing through which a lower portion of the extension tube extends, and a cavity formed in an upper portion of the extension tube;
   wherein the compression bearing is bonded to an inner surface of the housing.

17. The flexible joint of claim 16, wherein the central pipe is substantially coaxial with the extension tube and inserted at least partially within the cavity formed in the upper portion of the extension tube, such that the central pipe is configured to exert, by the central pipe contacting the extension tube, a compression force on the compression bearing when the flexible joint is assembled.

18. The flexible joint of claim 17, wherein the compression bearing is configured to allow the extension pipe to traverse angularly up to about 20 degrees as measured from a central axis extending through the flexible joint.

19. The flexible joint of claim 16, wherein the inner bonding material comprises an elastomeric material.

20. The flexible joint of claim 19, wherein the inner bonding material comprises a plurality of layers of the elastomeric material.

* * * * *